(No Model.)

H. G. CADY.
CURRENT WHEEL.

No. 249,299.  Patented Nov. 8, 1881.

Witnesses:
H. C. McArthur
W. R. Keyworth

Inventor,
H. G. Cady
per
J. A. Alexander
Attorney

UNITED STATES PATENT OFFICE.

HENRY G. CADY, OF PINE BLUFF, ARKANSAS.

CURRENT-WHEEL.

SPECIFICATION forming part of Letters Patent No. 249,299, dated November 8, 1881.

Application filed August 9, 1881. (No model.)

*To all whom it may concern:*

Be it known that I, HENRY G. CADY, of Pine Bluff, in the county of Jefferson and State of Arkansas, have invented certain new and useful Improvements in Current-Wheels; and I do hereby declare that the following is a full, clear, and exact description thereof, reference being had to the accompanying drawings, and to the letters of reference marked thereon, which form part of this specification.

This invention relates to that class of water-wheels known as "tide-water wheels," or "floating water-powers," which are supported upon a floating frame that is anchored in the stream, the motion derived from the rotary shaft that is driven by the paddle-wheel being transmitted by suitable mechanism to the device that is located on shore and designed to be driven by said motor.

The object of my improvement is to facilitate the raising and lowering of the paddle-wheel, so as to vary the depth to which the paddle-wheel blades shall penetrate the water, such object being attained by means of the devices hereinafter described, and illustrated in the annexed drawings, in which—

Figure 1:
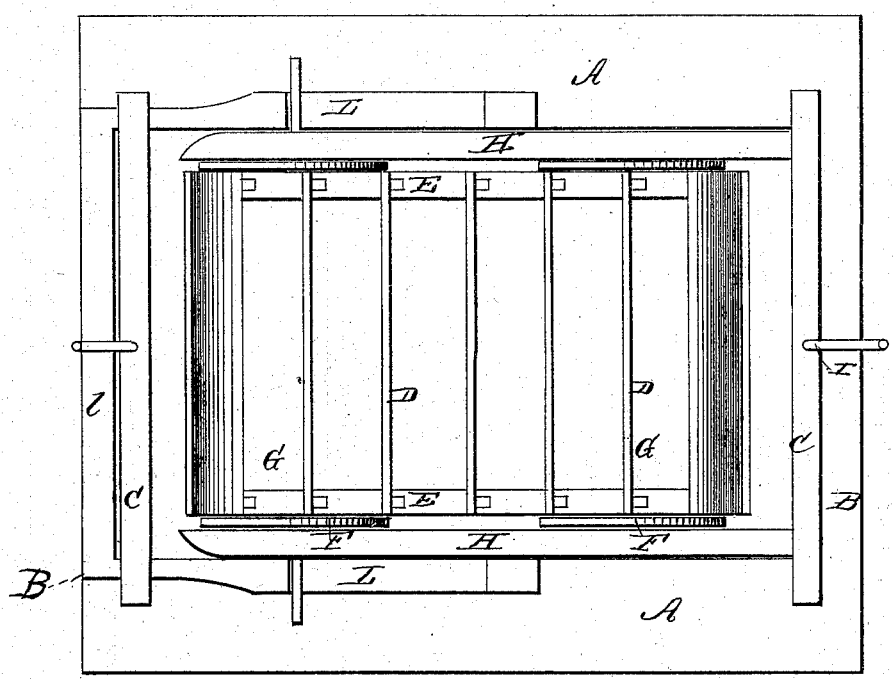
Figure 2:
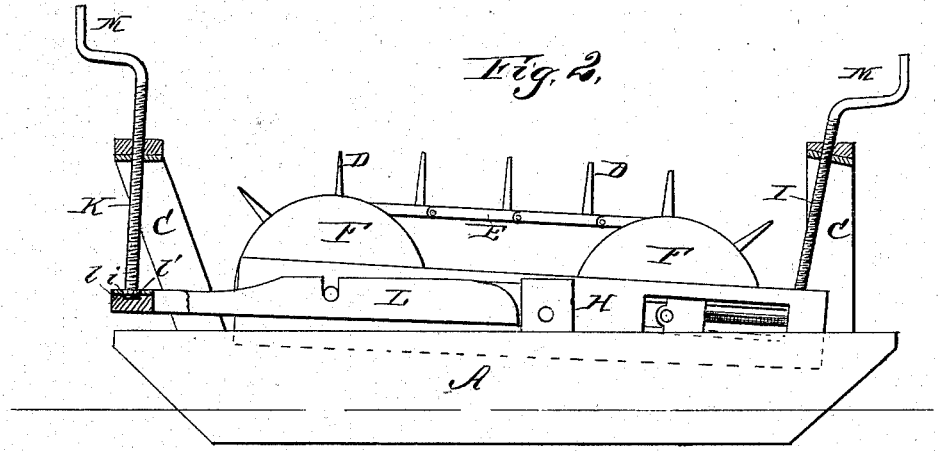

Figure 1 is a plan view, and Fig. 2 a side elevation, partly in section.

A A designate two long side floats that are adapted to support the mechanism on the water. These floats are connected at their ends by the transverse bars B B, so as to constitute a rectangular frame, at the ends of which are the upright frames C, each composed of two standards secured to the floats, and the cross-bars connecting the top ends of the said standards.

D D indicate the paddle-blades, which are secured at their ends to the links of the two endless chains E E, which will preferably be made of wood, in the manner set forth in another application filed by me for a wooden chain. These chains pass around the sprocket-wheels F, which are arranged in pairs upon the shafts G within the main frame. These shafts have their bearings in the side bars of a wooden frame, H, that is arranged within the main frame and supported in the following manner. A rod, I, passing through the top cross-bar of one of the upright frames C, is connected with one end of the frame H, while a like rod, K, that passes through the cross-bar of the remaining one of these upright frames C, connects with the cross-bar *l* of a swinging frame, L, that is hinged at its ends to short standards upon the floats, and formed with bearings *l'* for the ends of one of the shafts, which extend through the frame H, as illustrated. In order, now, to provide for the raising and lowering of either one or both of the ends of the frame carrying the shafts, I form the upper portion of rod I with a screw-thread, and I also form the rod K in the same way, and swivel the rods in bed-plates *i* at their lower ends. The screw-threaded portions of these rods pass through plates secured to the cross-bars of the upright frames, and each rod is provided with a crank-handle, M, at its upper end, so that by turning rod I that end of the shaft-supporting frame with which it is connected can be raised or lowered, as the case may be, and by turning the rod K the hinged frame on which the outer ends of one of the shafts rest can be raised or lowered, thus effecting a like movement on the part of the end of the frame H, through which said shaft passes. By these means the paddle can be raised or lowered as occasion may require, and hence the power regulated.

Having thus described my invention, what I claim is—

The combination, in a floating water-power, of the floats, with the frame supporting the sprocket-wheel shafts, the paddle-blades secured to endless chains passing over the sprocket-wheels, the screw-threaded rod passing through a vertical frame at one end of the floats, and the screw-threaded rod at the other end of the floats passing through a similar vertical frame, one of these rods being connected with the frame supporting the shafts, and the remaining rod being connected with a hinged frame, on which the projecting ends of one of the shafts rest, both rods being adapted to be turned, substantially as and for the purpose specified.

In testimony that I claim the foregoing as my own I affix my signature in presence of two witnesses.

H. G. CADY.

Witnesses:
T. H. ALEXANDER,
W. R. KEYWORTH.